United States Patent [19]

Iijima

[11] Patent Number: 4,522,470

[45] Date of Patent: Jun. 11, 1985

[54] LIQUID CRYSTAL COMPOSITION AND DISPLAY DEVICE

[75] Inventor: Chiyoaki Iijima, Shiojiri, Japan

[73] Assignee: Epson Corporation, Nagano, Japan

[21] Appl. No.: 510,850

[22] Filed: Jul. 5, 1983

[30] Foreign Application Priority Data

Jul. 5, 1982 [JP] Japan ............................. 57-116492

[51] Int. Cl.$^3$ ........................... C09K 3/34; G02F 1/13
[52] U.S. Cl. .......................... 350/350 R; 252/299.61; 252/299.63; 350/332; 350/333
[58] Field of Search ..................... 252/299.63, 299.61; 350/350 R, 332, 333

[56] References Cited

U.S. PATENT DOCUMENTS

| | | | |
|---|---|---|---|
| 4,229,315 | 10/1980 | Krause et al. | 252/299.63 |
| 4,309,304 | 1/1982 | Harrison et al. | 252/299.63 |
| 4,313,878 | 2/1982 | Hsu | 252/299.61 |
| 4,322,354 | 3/1982 | Sorfin | 252/299.61 |
| 4,323,471 | 4/1982 | Sethofer | 252/299.61 |
| 4,323,472 | 4/1982 | Sethofer | 252/299.61 |
| 4,328,116 | 5/1982 | Harrison | 252/299.64 |
| 4,364,838 | 12/1982 | Boller et al. | 252/299.61 |
| 4,372,871 | 2/1983 | Toriyama et al. | 252/299.61 |
| 4,410,445 | 10/1983 | Baur et al. | 252/299.5 |

FOREIGN PATENT DOCUMENTS

| | | | |
|---|---|---|---|
| 74608 | 3/1983 | European Pat. Off. | 252/299.63 |
| 2934918 | 3/1980 | Fed. Rep. of Germany | 252/299.63 |
| 56-2371 | 1/1981 | Japan | 252/299.63 |
| 56-149487 | 11/1981 | Japan | 252/299.63 |
| 56-149488 | 11/1981 | Japan | 252/299.63 |
| 57-85881 | 5/1982 | Japan | 252/299.61 |
| 2017742 | 10/1979 | United Kingdom | 252/299.63 |
| 2028363 | 3/1980 | United Kingdom | 252/299.63 |
| 2067586 | 7/1981 | United Kingdom | 252/299.61 |

*Primary Examiner*—Teddy S. Gron
*Attorney, Agent, or Firm*—Blum, Kaplan, Friedman, Silberman & Beran

[57] ABSTRACT

Liquid crystal compositions for use in multiplex operations have a positive dielectric anisotropy of about 0.10 to about 0.12. Liquid crystal display devices having cell thicknesses of about 4 to 6 microns incorporate such liquid crystal compositions and operate at a duty ratio of 1/16 and voltages no greater than 5 V.

26 Claims, 2 Drawing Figures

LIQUID CRYSTAL COMPOSITION AND DISPLAY DEVICE

BACKGROUND OF THE INVENTION

This invention relates generally to an improved liquid crystal composition, and in particular to an improved liquid crystal composition suitable for multiplex operation and to a liquid crystal display device including the liquid crystal composition.

Liquid crystal display devices including liquid crystal display elements have found increasing utility in applications such as alpha-numeric displays and graphic displays. Liquid crystal display devices which are adapted for multiplex operation, using conventional nematic liquid crystal composition have experienced drawbacks in operation. For example, it is desirable that such liquid crystal display cells operate at a duty ratio of about 1/16. It is also preferable that the electronic devices operate at low voltage supplies, preferably no more than about 5 V.

In multiplex display devices, when the display device is operated at a duty ratio of about 1/16, the threshold voltage rises, causing the central driving voltage, $V_{op}$, to also rise. When the $V_{op}$ rises it generally rises to the range of up to about 8 V. Such a high voltage exerts a heavy drain on the driving circuit and can cause the voltage margin M to assume a negative value. These conventional liquid crystal cells also retard the display response speed, thereby contributing to a general discoloration of the liquid crystal display, marred display and reduced display contrast. The retardation in the display cell affects the display appearance, e.g. whiteness and brightness. Retardation depends upon display cell thickness and liquid crystal optical anisotropy.

Fabrication of liquid crystal cells having thicknesses in the range of 4 to 6 microns is now possible. In order to provide a suitable retardation R, to allow for optimum display whiteness and brightness it is necessary to provide liquid crystal compositions having optical anisotropy in the range of 0.10 to 0.12, which can also withstand the normal parameters of operation of liquid crystal display devices, such as working temperature range, low operating voltage, large voltage margin, and rapid response speed.

Accordingly, it is desirable to provide a liquid crystal composition having an optical anisotropy in the range of about 0.10 to about 0.12 and other advantageous properties and to provide a liquid crystal device including such compositions.

SUMMARY OF THE INVENTION

Generally speaking, in accordance with the invention, a liquid crystal composition suitable for use in a multiplex liquid crystal display device includes at least one compound of each of groups (1), (2), (3), and (4), as follows:

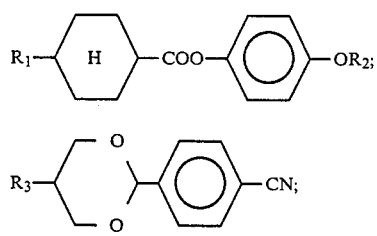

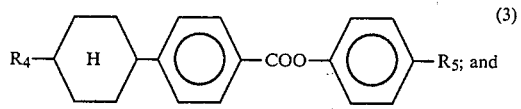

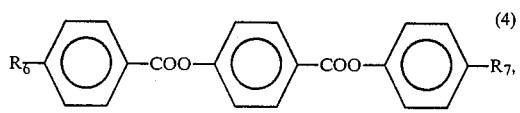

wherein, $R_1$ denotes a straight-chain alkyl group having 3 to 6 carbon atoms; $R_2$ denotes a straight-chain alkyl group having 1 to 6 carbon atoms; $R_3$ denotes a straight-chain alkyl group having 2 to 5 carbon atoms; $R_4$ denotes a straight-chain alkyl group having 3 to 5 carbon atoms; $R_5$ denotes a straight-chain alkyl group having 1 to 7 carbon atoms; $R_6$ denotes a straight-chain alkyl group having 3 to 5 carbon atoms, and $R_7$ denotes a straight-chain alkyl group having 1 to 5 carbon atoms. Such compositions when used in liquid crystal display devices and driven at a duty ratio of up to 1/16 can be operated at voltages below about 5 V at room temperature. They are suitable for use in peripheral devices for alpha-numeric and graphic display. When used in liquid crystal display devices the retardation R can be controlled to acceptable ranges. The cells exhibit high display contrast, good appearance, and no discoloration.

Accordingly, it is an object of the invention to provide and improve liquid crystal composition.

Another object of the invention is to provide and improve liquid crystal commposition having an optical anisotropy in the range of about 0.10 to 0.12.

A further object of the invention is to provide a liquid crystal composition providing enough voltage margin during multiplex operation.

Still a further object of the invention is to provide a liquid crystal composition capable of providing enough voltage margin when operating at a duty ratio of 1/16.

Yet another object of the invention is to provide an improved liquid crystal display device including a twisted nematic liquid crystal display cell and liquid crystal composition having an optical anisotropy between about 0.10 and 0.12.

Still another object of the invention is to provide a liquid crystal display device including liquid crystal composition having an optical anisotropy of about 0.10 to about 0.12 suitable for use in a liquid crystal display device and has a wide working temperature range, low operating voltage, large voltage margin, quick response speed, high display contrast and exhibits no discoloration.

Still other objects and advantages of the invention will in part be obvious and will in part be apparent from the specification.

The invention accordingly comprises a composition of matter possessing the characteristics, properties, and relation of constituents which will be exemplified in the compositions hereinafter described and the apparatus embodying features of construction, combinations of elements including these compositions and arrangement of parts which are adapted to use these compositions, all as exemplified in the following detailed disclosure, and the scope of the events will be indicated in the claims.

BRIEF DESCRIPTION OF THE DRAWINGS

For a fuller understanding of the invention, reference is had to the following description, taken in connection with the accompanying drawings, in which.

DESCRIPTION OF THE PREFERRED EMBODIMENT

Figure 1:
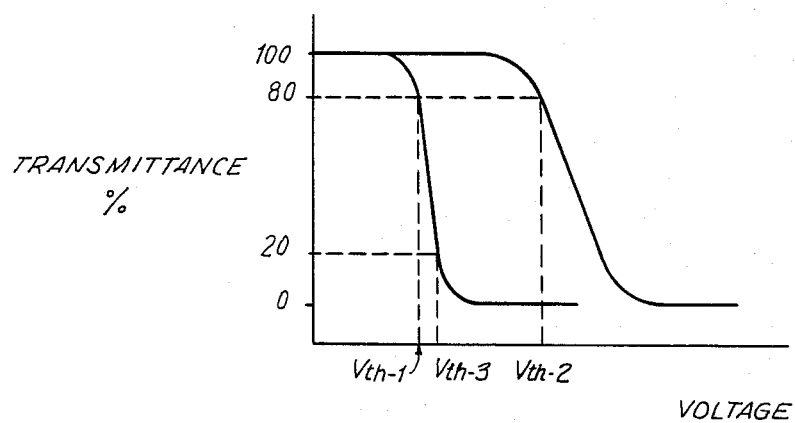
FIG. 1 is a graph illustrating the relationships between operating voltage and transmittance in a multiplex liquid crystal device.

Conventional display devices incorporating a nematic liquid crystal which exhibits positive dielectric anisotropy include the nematic liquid crystal disposed in a twisted orientation between a pair of electrode plates. The cell is then positioned between a pair of polarizing sheets. The surfaces of the electrode plates are treated to cause the liquid crystals to align with the treated surfaces. When one treated plate is disposed perpendicular to the opposed treated plate the nematic liquid crystal rests in twisted configuration.

In a liquid crystal display device adapted for use in a time-sharing operation, the operating voltage range is limited as a result of the characterics of liquid crystal compositions. This limited range can pose a problem in designing a device for use in a multiplex operation. Referring now to the graph in the Figure, $V_{th-1}$ and $V_{th-2}$ represent the threshold voltages at which visual discernable changes in light transmittance are generally first noticeable when a selective wave form and a semi-selective wave form are applied to the liquid crystal, respectively. The voltage $V_d$ required to turn display devoice on and off, $V_d$ is limited to the following ranges:

$$V_{th-1} < V_d < V_{th-2}$$

The range of $V_d$ in a cell decreases proportionately to a decrease in the duty ratios. In order to provide adequate display contrast for practical use, the light transmittance for the selective wave form in the figure is required to be about 20%.

When $V_{th-3}$ represents the threshold voltage which allows this amount of light transmittance, then voltage $V_d$ will preferably fall within the following range:

$$V_{th-3} < V_d < V_{th-2}$$

Threshold voltages $V_{th-2}$ and $V_{th-3}$ exhibit a visual angle dependency, so that their values will decrease in proportion to a decrease in the angle formed between the display panel and the direction of visual observation (visual angle). When $V_{th-2}(\alpha)$ and $V_{th-3}(\alpha)$ represent the threshold voltages on the small visual angle side and $V_{th-2}(\beta)$ and $V_{th-3}(\beta)$ stand for the threshold voltages on the large visual angle side, the following relationships will exist:

$$V_{th-2}(\alpha) \leq V_{th-2}(\beta)$$

$$V_{th-3}(\alpha) \leq V_{th-3}(\beta)$$

Within this visual angle range, the voltage $V_d$ capable of turning on and off the display will fall in the following range:

$$V_{th-3}(\beta) < V_d < V_{th-2}(\alpha)$$

In a twisted nematic liquid crystal display device, there is a specific direction in which the highest display contrast is obtained and is referred to as the direction of clear vision. Generally, in order for a display device to be useable the visual angle in the direction of clear vision falls in the range of 50 to 80 degrees from this side to the opposite side in the perpendicular plane which stands on the liquid crystal panel. The angles for the variables $V_{th-3}(\beta)$ and $V_{th-2}(\alpha)$, therefore, are respectively 80 degrees for the former and 50 degrees for the latter; thus, $V_{th-3}(80°)$ and $V_{th-2}(50°)$. It follows that the operating voltage $V_d$ for the display cell should reside within the following range:

$$V_{th-3}(80°) < V_d < V_{th-2}(50°)$$

The operating voltage of the display cell varies further with time due to changes in battery voltage and differences in circuit performance. As a criterion for the allowance of variation in the operating voltage, the voltage margin (M) is defined as indicated by the following formula. The margin is used for expressing the suitability of a given liquid crystal for a time-sharing operation.

$$M = \frac{V_{th-2}(50°) - V_{th-3}(80°)}{V_{op}} = \times 100\ (\%)$$

wherein, $V_{op}$ denotes the central operating voltage defined by the following formula.

$$V_{op} = \tfrac{1}{2} V_{th-2}(50°) + V_{th-3}(80°)$$

The voltage margin, for practical purposes is not required to be not less than 2% when the duty ratio is 1/16.

For a liquid crystal cell to provide a display with as white and bright an appearance as possible, the value of retardation R is required to fall in the range of 1.0 to 1.2μ, or 0.4 to 0.5μ. Factors which determine retardation include cell thickness and liquid crystal optical anisotropy.

Let d stand for the thickness between cell electrode plates in the liquid crystal cell, $n_o$ for the refractive index of light normal to the liquid crystal molecules, $n_e$ for the refractive index of the abnormal light, and $\Delta_n = (n_o - n_e)$ for the optical anisotropy. The retardation R will have the following relationship to thickness and optical anisotropy:

$$R = d(n_o - n_e) = d \cdot \Delta_n$$

As a result of the relationship between cell thickness and optical anisotropy, variations in display response speed in a cell are understood.

It is preferred to limit R to the range of about 1.0 to about 1.2 microns. In order to do this it is necessary to limit the thickness of the liquid crystal cell to the range of about 7 to 10 microns. It is also necessary under these circumstances for the optical anisotropy, $\Delta_n$, to have a value of about 0.18. When R is limited to the range of about 0.4 to about 0.5 microns, it is necessary that the cell thickness be in the range of about 4 to 6 microns. With this cell thickness range, the optical anisotropy, $\Delta_n$, should be in the range of about 0.10 to about 0.12.

Conventional manufacturing techniques have not been able to provide for accurate adjustment of the thickness of a liquid crystal within the limits of 7 to 10 microns. There has also been an inability to produce a satisfactory liquid crystal composition having an optical anisotropy, $\Delta_n$, within the range of 0.1 to 0.12. It has been conventional to limit retardation R to within the range of 1.0 to 1.2 microns by using liquid crystals in liquid crystal cells having a thickness of about 7 to about 10 microns, wherein the liquid crystals have an optical anisotropy of about 0.18. However, the conventional liquid crystal cells having a retardation range of 1.0 to 1.2 microns have greater thicknesses than those cells having retardation values in the range of 0.4 to 0.5 microns. As a result of this increased thickness, the conventional cell suffer from the drawback of retarded display response speed. The retarded response speed results from the relative thickness of the display cell. Generally speaking, display response speed is inversely proportional to the square of the cell thickness.

Conventional liquid crystal cells have suffered from the various drawbacks above-described. Since the manufacture of liquid crystal cells has progressed to the point where their thickness can be controlled in the range of about 4 to 6 microns, it is important to provide a liquid crystal composition having an optical anisotropy in the range of 0.10 to about 0.12, which can operate under normal service conditions. Thus, in addition to the above-mentioned object, further objects of the invention providing a liquid crystal composition having a wide visual angle. This will provide a display cell which produces a bright display having satisfactory contrast when turned on (visual angle).

The liquid crystal composition and the display cells of the invention should have the following characteristics. The index of birefringence and the cell thickness should be minimized. The visual angle should be increased to the fullest extent possible without causing discoloration or reduction in cell brightness. The liquid crystal compositions should possess a voltage margin of not less than 2% during the time-sharing operation performed at a duty ratio 1/16, with a main operating voltage of no greater than about 5 V at room temperature. Additionally, the response time for turning on and off of the display should not exceed 150 m.sec. at room temperature.

A liquid crystal composition in accordance with the invention includes at least one compound selected from each of groups (1), (2), (3), and (4) as follows:

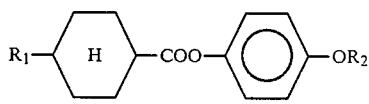  (1)

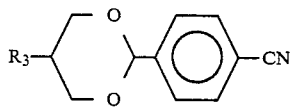  (2)

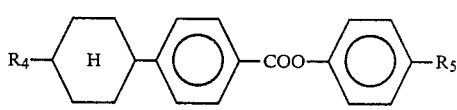  (3)

-continued

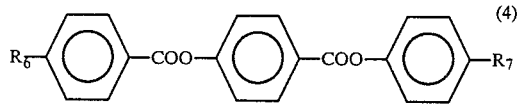  (4)

wherein, $R_1$ denotes a straight-chain alkyl group having 3 to 6 carbon atoms; $R_2$ denotes a straight-chain alkyl group having 1 to 6 carbon atoms; $R_3$ denotes a straight-chain alkyl group having 2 to 5 carbon atoms; $R_4$ denotes a straight-chain alkyl group having 3 to 5 carbon atoms; $R_5$ denotes a straight-chain alkyl group having 1 to 7 carbon atoms; $R_6$ denotes a straight-chain alkyl group having 3 to 5 carbon atoms; and $R_7$ denotes a straight-chain alkyl group having 1 to 5 carbon atoms.

Table 1 sets forth representative examples of liquid crystal compositions in accordance with the invention. Compounds of the formula (1) include the substituents for $R_1$ and $R_2$ as set forth from the Table at lines A-I. Compounds of formula (2) include substuent $R_3$ as set forth at lines J-L. Compounds of formula (3) include substituents $R_4$ and $R_5$ as illustrated in lines M-N and P-U. Compounds of the formula (4) include substituents $R_6$ and $R_7$ as set forth in lines O and V-Y. Liquid crystal compositions including compounds A-N and O are set forth in Table 2.

Compounds of formula (1) are ester cyclohexane or ECH-type (Ester Cyclohexane-type) liquid crystals. The compositions of the invention incorporate these compositions. The ECH-type liquid crystals of the invention have small values for optical anisotropy, in the range of about 0.12. These compositions are preferably added in amounts of about 40 to about 70% by weight of the liquid crystal compositions of the invention. When the cell thicknesses is within the range of 4 to 6 microns, the optical anisotropy of the liquid crystal composition is close to that of the compounds of formula (1) incorporated in the compositions. Consequently, liquid crystal cells using these liquid crystal compositions have values for retardation, R, in the range of 0.4 to 0.5 microns. As a result, liquid crystal display devices having a wide field of view and bright appearance are produced.

Liquid crystal cells including the compositions of the invention have increased response speed in comparison with conventional cells having a thickness of up to about 7 microns. Compounds of formula (1) have large voltage margins and wide working temperature ranges. The liquid crystal compositions of the invention include compounds of formula (1) as their base liquid crystal material and accordingly, provides cells with proportional increases in voltage margin and working temperature range. Compounds of formula (1) are quite soluble in the other liquid crystal compositions of the invention. This permits use of these compounds as the base liquid crystal to which the liquid crystals of formulas (2) to (4) are admixed in the manufacture of the liquid crystal compositions in accordance with the invention. Liquid crystal compositions which include higher concentrations of compounds of formula (1) than indicated above, do not function with acceptably low operating voltages. Therefore, the proportions of the compounds of formula (1) in the liquid crystal compositions of the invention are limited to the range of about 40 to about 70% by weight of the total composition. Preferred compositions included compounds of the formula (1) wherein substituent $R_1$ includes straight-chain alkyl groups having from 3 to 6 carbon atoms and substituent $R_2$ includes straight-chain alkyl groups of from 1 to 6 carbon atoms.

The compounds of formula (2) are dioxane-type liquid crystals. In the general formula for these compounds, $R_3$ includes straight-chain alkyl groups having 2 to 5 carbon atoms. These compounds are present in the liquid crystal compositions of the invention in a weight range of between about 25 to 45%. The compositions of formula (2) have low value of optical anisotropy in the range of about 0.09 to 0.10. Similar to the compounds of formula (1) inclusion of these compounds in the liquid crystal compositions of the invention helps maintain the optical anisotropy $\Delta_n$ of the composition of the invention close to the preferred range of 0.10 to 0.12. Moreover, the compositions formula (2) have large values of dielectric anisotropy, in the range of about 20. Incorporating these compounds in the liquid crystal compositions of the invention helps provide for effective operation at low voltage levels. For example, when the liquid crystal compositions contain compounds of formula (2) in concentrations of at least about 20% by weight, the compositions will function at a duty ratio of 1/16 with not more than about 5 V of the central operating voltage at room temperature.

The compounds of formula (2) can crystalize out of the liquid crystal compositions of the invention when they are present in excess amounts. Therefore, the compositions of the invention contain a preferred amount of these compounds in the range of about 25 to about 45% by weight. The incorporation of these compounds into the composition of the invention allows the devices to operate effectively at a central working voltage, $V_{op}$, of no more than about 5 V, and at a duty ratio of 1/16 at room temperature.

The compounds of formula (3) are phenylcyclohexyl (PCH) ester-type liquid crystals. Use of PCH esters when mixed with negative benzoate esters was disclosed to produce broader temperature ranges than PCH's esters alone in liquid crystal mixtures. However, problems in alignment and unwanted coloration due to low birefringence were reported in Properties Important for Multiplexing, Moeller, 1980 Wescon Professional Program, Anaheim, Calif., September 16-18, pages 1-4. In the compound of formula (3) of the invention, $R_4$ represents a straight-chain alkyl group having 3 to 5 carbon atoms and $R_5$ includes straight-chain alkyl groups having 1 to 7 carbon atoms. The compounds of formula (3) have higher clearing point levels than the compounds of formulas (1) and (2). The incorporation of the compounds of formula (3) in the liquid crystal compositions of the invention raises the upper limits of the working temperatures of the compositions. Moreover, the compounds of formula (3) have low levels of viscosity and when they are incorporated into the compositions of the invention the display response speed is increased. The compounds of formula (3) are preferably included in an amount between about 3 to 15% by weight of the composition. When the compounds are added in greater amounts, they tend to crystalize out of the composition. Therefore, the preferred range is limited to between about 3 to 15% by weight.

Compounds of formula (4) are diester-type liquid crystals. In the general formula of these compounds, $R_6$ represents straight-chain alkly groups having 3 to 5 carbon atoms, and $R_7$ represents straight-chain alkyl groups having 1 to 5 carbon atoms. The compounds of formula (4) have higher clearing point levels than the compounds of formulas (1) and (2). This characteristic is similar to that of the compounds of formula (3). Incorporation of compounds of the formula (4) into the liquid crystal compositions of the invention raises the upper limit of the working temperature range. The compounds of formula (4) also are capable of widening the voltage margins of the compositions of the invention. These compounds are present in the compositions of the invention in the amount of about 3 to 15% by weight. Since the compounds, when present in excess proportions, are likely to crystalize out, they are limited to the range of about 3 to 15% by weight.

The compound identified as W of group (4) is transformed from a solid (crystal) state to a liquid crystalline state in the smectic phase and then to the liquid state isotropic phase as its temperature is elevated. The C-S point is the temperature at which the solid phase changes to the smectic phase. The S-I point is the transient temperature through which the smectic phase passes when changing to the isotropic phase. Compounds X and Y of group (4) are transformed from their solid state to the liquid state isotropic phase as the temperature is raised. The respective transient temperatures for transformation, the melting points, are to 211.8° C. and 200.8° C. for these compounds. Although compounds W, X, and Y have different transient states, as described above, from that of compound V of those of formula (4), it has been observed that these compounds when incorporated in the liquid crystal compositions of the invention behave similarly to compound V.

TABLE I

| Compounds | | $R_1$ | $R_2$ | Melting point (°C.) | Clearing point (°C.) |
|---|---|---|---|---|---|
| (1) | A | $C_3H_7$ | $C_2H_5$ | 47 | 78 |
| | B | $C_3H_7$ | $C_4H_9$ | 41 | 71 |
| | C | $C_3H_7$ | $C_5H_{11}$ | 33 | 62 |
| | D | $C_4H_9$ | $CH_3$ | 42 | 60 |
| | E | $C_4H_9$ | $C_2H_5$ | 35.5 | 74 |
| | F | $C_4H_9$ | $C_6H_{13}$ | 25 | 70 |
| | G | $C_5H_{11}$ | $CH_3$ | 40 | 69.5 |
| | H | $C_5H_{11}$ | $C_5H_{11}$ | 34 | 72 |
| | I | $C_6H_{13}$ | $C_2H_5$ | 49.2 | 83.2 |
| Compounds | | $R_3$ | | | |
| (2) | J | $C_2H_5$ | | 66.2 | 14.8 |
| | K | $C_4H_9$ | | 40 | 35 |
| | L | $C_5H_{11}$ | | 55 | 47 |
| Compounds | | $R_4$ | $R_5$ | | |
| (3) | M | $C_3H_7$ | $C_2H_5$ | 98 | 175 |
| | N | $C_3H_7$ | $C_5H_{11}$ | 78 | 167 |
| | P | $C_3H_7$ | $CH_3$ | 113.5 | 178.6 |
| | Q | $C_3H_7$ | $C_2H_5$ | 98 | 175 |
| | R | $C_3H_7$ | $C_3H_7$ | 89 | 186 |
| | S | $C_5H_{11}$ | $C_7H_{15}$ | 93 | 138.5 |
| | T | $C_3H_7$ | $C_6H_{13}$ | 65 | 158 |
| | U | $C_3H_7$ | $C_7H_{15}$ | 73 | 160 |
| Compounds | | $R_6$ | $R_7$ | | |
| (4) | O | $C_4H_9$ | $C_4H_9$ | 89 | 173 |
| | V | $C_4H_9$ | $C_5H_{11}$ | 118.6 | 189.3 |
| | W | $C_5H_{11}$ | $C_2H_5$ | (C-S point) 81 Melting | (S-I point) 111 |
| | X | $C_3H_7$ | $CH_3$ | point) 211.8 | |
| | Y | $C_3H_7$ | $C_2H_5$ | Melting point) 200.8 | |

Table 2 illustrates combinations of the compounds of formulas (1) through (4) in proportions to provide liquid crystal compositions in accordance with the invention. The liquid crystal compositions of Table 2 are identified as compositions 1 through 5. Each of these compositions has a clearing point of about 60° C. Each shows no signs of deterioration in quality after exposure four days at −20° C. These compositions, therefore, are satisfactory for use in the normal operative temperature range, e.g. 0° to 40° C., for electronic devices. The compositions in Examples 1–5 have low operating voltages, not exceeding about 5 V at 25° C. In this case, Examples 1–5 are driven at a duty ratio of 1/16 in the multiplex driving method with the voltage $V(\sqrt{N}+1)$ (V: voltage applied to the liquid crystal when it is turned off; N: number of multiplex) applied to the liquid crystal when it is turned on, and with N=16. Their voltage margins are not less than 2.0%. These voltage margins are acceptable in practical applications. The response speed at 25° C., as measures by response speed during rise time, $T_R$, and response speed during fall time, $T_F$, are quite high, e.g. about 100 ms, below 150 ms, at 25° C. The optical anisotropy, $\Delta_n$, of the compositions of Examples 1–5 are within the range of about 0.10 to 0.12. Liquid crystal cells having a thickness of about 4 to 6 microns and incorporating these compositions of Examples 1–5 have retardation, R, values within the acceptable range of 0.4 to 0.5 μ. These liquid crystal cells resist discoloration and have good contrast and whiteness in the displays.

Figure 2:
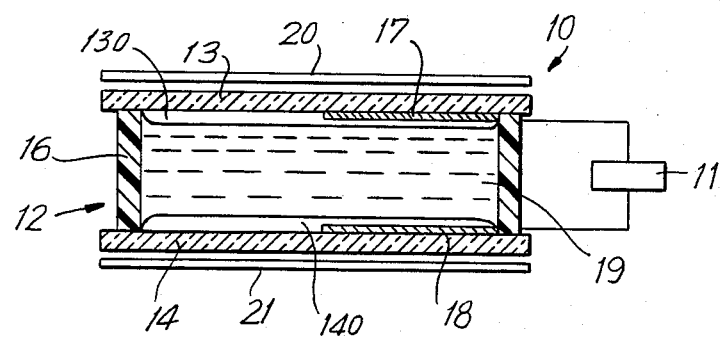
FIG. 2 is a cross-sectional view of a liquid crystal display device including a time-sharing drive circuit and liquid crystal composition in accordance with the invention.

Table 2 also sets forth results when the compositions are tested in a liquid crystal cells having a thickness of about 4.5 microns. The results indicate that the individual composition give differing operating characteristics. A representative liquid crystal display device 10 is shown in FIG. 2 and includes a time-sharing drive circuit 11 for applying time-sharing drive signals to a liquid crystal cell 12. Cell 12 includes an upper substrate 13 and a lower substrate 14 spaced apart by a spacer 16 and each having electrodes 17 and 18 disposed on the interior surfaces, respectively. Cell 12 also includes an upper polarizer 20 and a lower polarizer 21, and if necessary may include a reflector under lower polarizer 21. A liquid crystal composition 19 in accordance with the invention is disposed in the space between substrates 13 and 14 and is twisted about 90° (80° to 100°) and further, is covered with the liquid crystal molecule orientation layers 130 and 140. Signals are selectively applied to electrodes 17 and 18, and the voltage drop between cooperating opposed electrodes causes that portion of the liquid crystal material threbetween to be rendered visually distinguishable from the remainder of the liquid crystal material in response to polarized light entering cell 12. At least one of electrode 17 and 18 is transparent. In a transmissive cell, both electrodes 17 and 18 are transparent.

Example 1 in Table 2 is a liquid crystal composition containing ECH-type liquid crystal compounds of the formula (1) as the base liquid crystal in an amount of about 56.5 weight percent of the composition. The composition has a high clearing point of 61.0° C. It also has a wide working termperature range, and a relatively high operating voltage, $V_{op}$, of about 4.89 V.

Example 2 is a liquid crystal composition of the invention including about 45.0 weight percent of a compound of formula (1) and about 41.0 weight percent of a dioxane type liquid crystal compound of formula (2). As a result, the liquid crystal composition has a clearing point of about 57.5° C., which is slightly less than 60° C. level. The composition also has a very low operating voltage, $V_{op}$, of 4.20 V. The response speed is also high; it is 110 ms during rise time, $T_R$, and 70 ms during the fall time, $T_F$.

Example 3, is a liquid crystal composition which contains dioxane type liquid crystal compounds of formula (2) in a relatively large proportion of about 36.0 weight percent. This is closer to the proportion in Example 2 (41.0 weight percent) than that of Example 1 (27.5 weight percent). Example 3 contains 5 weight percent more of compounds of formula (1) and 5 weight percent less of compounds of formula (2), in comparison with Example 2. Consequently, this composition of Example 3 effectively combines advantages of compounds of formula (1) in increasing the voltage margin, with the advantages of compounds of the formula (2) in lowering the operating voltage $V_{op}$. The liquid crystal composition of Example 3 has a clearing point of 60.2° C. This slightly exceeds the 60° C. level. The composition also has a low operating voltage, $V_{op}$, of 4.25 V at 25° C. It has a large operating voltage margin, M of 2.4%. Response speed is very high, 90 ms during rise time, $T_R$ and 80 ms during fall time, $T_F$. These response speeds are below the 100 ms level.

Example 4 is a liquid crystal composition of the invention which contains compounds of formula (1) in amounts of 64.0 weight percent. It also has a lower relative proportion of compounds of formulas (3) and (4) than do the other Examples. A consequence of the large weight percent of compounds of formula (1) is that the composition of Example 4 has a large voltage margin, M, of 2.5%, and also a higher operating voltage, $V_{op}$ of 4.95 V.

The liquid crystal composition in Example 5 includes a relatively larger proportion of compounds of formula (3) than in the other Examples. In addition, the compounds of formula (1) in Example 5 is relatively large. The combination of the relatively large proportions of compounds of the formula (1) and formula (3) give the liquid crystal composition of Example 5 an operating voltage, $V_{op}$ of 4.98 volts, which is very close to the 5 V level. The voltage margin, M, is 2.3%, which is slightly above the 2.0 level.

TABLE 2

|  |  | Example 1 % by weight | Example 2 % by weight | Example 3 % by weight | Example 4 % by weight | Example 5 % by weight |
|---|---|---|---|---|---|---|
| Compound (1) | A | 6.0% |  | 5.0 | 7.0 | 5.0 |
|  | B | 15.0 |  | 13.2 | 15.0 | 11.0 |
|  | C |  | 9.0 |  |  | 10.0 |
|  | D | 11.5 | 7.0 | 10.2 | 12.0 | 10.0 |
|  | E | 11.5 |  | 10.3 | 12.0 | 10.0 |
|  | F |  | 9.0 |  |  |  |
|  | G | 12.5 |  | 11.3 | 13.0 | 9.0 |
|  | H |  | 12.0 |  | 5.0 |  |
|  | I |  | 8.0 |  |  |  |
|  | Total | 56.5 | 45.0 | 50.0 | 64.0 | 55.0 |
| Compound (2) | J | 14.0 | 11.0 | 9.0 | 7.0 | 10.0 |
|  | K | 7.0 | 15.0 | 13.5 | 10.5 | 10.0 |
|  | L | 6.5 | 15.0 | 13.5 | 10.5 | 8.0 |
|  | Total | 27.5 | 41.0 | 36.0 | 28.0 | 28.0 |

TABLE 2-continued

|  |  | Example 1 % by weight | Example 2 % by weight | Example 3 % by weight | Example 4 % by weight | Example 5 % by weight |
|---|---|---|---|---|---|---|
| Compound (3) | M | 8.0 |  |  |  |  |
|  | N |  | 7.0 | 7.0 | 4.0 | 11.0 |
|  | Total | 8.0 | 7.0 | 7.0 | 4.0 | 11.0 |
| Compound (4) | O | 8.0 | 7.0 | 7.0 | 4.0 | 6.0 |
|  | Total | 8.0 | 7.0 | 7.0 | 4.0 | 6.0 |
|  | Grand total | 100.0 | 100.0 | 100.0 | 100.0 | 100.0 |
| Clearing point, °C. |  | 61° C. | 57.5 | 60.2 | 59.0 | 61.4 |
| 4 days at −20° C. |  | OK | OK | OK | OK | OK |
| $V_{op}$ (V) |  | 4.89 V | 4.20 | 4.25 | 4.95 | 4.98 |
| M (%) |  | 2.2% | 2.0 | 2.4 | 2.5 | 2.3 |
| 25° C. $T_R$ |  | 120 ms | 110 | 90 | 130 | 120 |
| 25° C. $T_F$ |  | 110 ms | 70 | 80 | 110 | 110 |
| Δn |  | 0.10 | 0.11 | 0.10 | 0.12 | 0.11 |

The individual compounds of formulas (1) through (4) and their relative proportions do vary slightly from one to another in Examples 1 through 5 of Table 2. However, the liquid crystal compositions invariably have a wide working temperature range, low operating voltages below the 5 V level, large voltage margins, M, in excess of 2.0% and quick response speeds.

Liquid crystal compositions have found increasing utility in applications including alphnumeric and graphic displays. Liquid crystal cells are frequently used and operate at a duty ratio of 1/16. Electronic devices which include such liquid crystal cells often are rated at a power supply of 5 V. The liquid crystal compositions of the present invention provide for liquid crystal display devices which can operate at voltages below about 5 V. These compositions are highly suitable for use in peripheral devices and other, similar devices required to operate as alpha-numeric and graphic displays. Liquid crystal display devices incorporating the liquid crystal compositions of this invention when used as peripheral displays can operate effectively without requiring any increase in the power supply level to the system. This provides for overall low power consumption, characteristic of the liquid crystals. The liquid crystal compositions of this invention have values of optical anisotropy, $\Delta_n$, in the range of about 0.1 to about 0.12. When these compositions are used in liquid crystal display devices having a cell thickness of about 4 to 6 microns, the retardation, R, values are limited to the range of about 0.4 to 0.5 μ. Moreover the devices provide high display contrast, good appearance and no discoloration.

It is obvious that the liquid crystal compositions of Examples 1-5 in Table 2 can have low operating voltages, large voltage margins, quick response speeds and so on when driven at a duty ratio of above 1/16. And it is also obvious that the liquid crystal compositions and display device of this invention are useful and have merits when driven at a duty ratio of not only about 1/16 but also above 1/16.

It is allowed according to the present invention that further compounds are added to the liquid crystal composition including at least one compound of each of groups represented by the formulas (1), (2), (3) and (4). In such case, the liquid crystal composition incorporates compounds of formulas (1)-(4) in amounts of over about 90% and additional compounds as the rest. Additional substances are for example compounds of formulas (5) and (6), as follows:

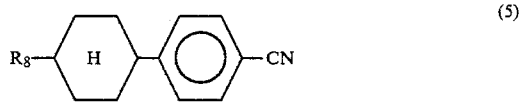

(5)

wherein, $R_8$ denotes an alkyl group or alkoxy group, and preferably, a straight-chain alkyl group having 2 to 8 carbon atoms; and

(6)

wherein, $R_9$ and $R_{10}$ each denotes an alkyl group or alkoxy group, and preferably, a straight-chain alkyl group having 2-5 carbon atoms.

Addition of compounds of formula (4) to the liquid crystal composition of the present invention increases the response speed. If compounds of formula (6) are admixed with the composition of the present invention, N-I point is increased without reducing the response speed, thereby expanding the range wherein liquid crystal display is possible. As described above, if the compounds of formula (5) and/or (6) are added to the liquid crystal composition of the present invention including at least one of each of compounds represented by the formulas (1)-(4) in amounts of about 1 to 10 weight percent as the total, the nature and advantage of the compounds of formulas (5) and (6) are added to those of the composition of the present invention with the basic nature and advantage of the latter held, whereby an improved liquid crystal composition is achieved. Accordingly, the liquid crystal display device using such liquid crystal composition is also improved.

Furthermore, it is permitted that cholesteric liquid crystal, chiral nematic liquid crystal, optically active compounds, for example, are added to the liquid crystal composition including at least one of each of compounds represented by the formulas (1)-(4) in amounts of about 0.01 to 3 weight percent, and preferably, about 0.01 to 2 weight percent.

The optically active compounds are for example the compounds represented by the following formulas:

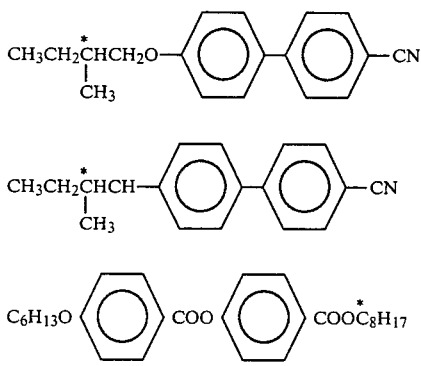

The compounds of formulas (7) to (9) are of high solubility to liquid crystals.

One example of cholesteric compounds is represented by the following formula:

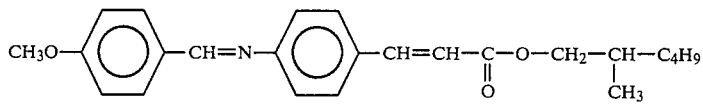

Addition of at least one of the compounds of formulas (7) to (10) reduces several states of orientation, for example, clockwise and anti-clockwise, into one state. The compounds of formulas (7) and (8) take different directions in optical activity with each other. With addition of the compounds of formulas (7) and (8) in combination, a liquid crystal composition is obtained having a threshold voltage of a low temperature-dependency. As a result, the liquid crystal display device is allowed to include no temperature compensating circuit or a low precise temperature compensating circuit. In these cases, it is satisfactory to add the compound of formula (7) and the compound of formula (8) in an amount of about 1/10 of the amount of the compound of formula (7) to the aforementioned composition of the present invention.

If the composition of the present invention is blended with at least one compound of formulas (5) and/or (6) and at least one compound of formulas (7), (8), (9) and/or (10), it is possible to obtain a liquid crystal composition having a stable orientation. Such composition posesses a thus improved nature of liquid crystal and hence is worth using.

The liquid crystal compositions of the present invention and the liquid crystal display devices incorporating these liquid crystal compositions are highly useful in multiplex displays and should favorably contribute to the growth of the industry.

It will thus be seen that the objects set forth above, among those made apparent from the preceding description, are efficiently attained and, since certain changes may be made in the above composition of matter and liquid crystal display cell without departing from the spirit and scope of the invention, it is intended that all matter contained in the above description shall be interpreted as illustrative and not in a limiting sense.

In this invention and its claims, the liquid crystal composition and display device involve at least one of each of compounds (1)–(4), and it is a matter of course that the liquid crystal composition and display device of this invention and the following claims may involve the other compositions which do not extremely change the spirit of this invention.

It is also to be understood that the following claims are intended to cover all of the ageneric and specific features of the invention herein described and all statements of the scope of the invention which, as a matter of language, might be said to fall therebetween.

Particularly it is to be understood that in said claims, ingredients or compounds recited in the singlular are intended to include compatible mixtures of such ingredients wherever the sense permits.

What is claimed is:

1. A liquid crystal composition comprising at least one of each of compounds represented by the formulas (1), (2), (3), and (4):

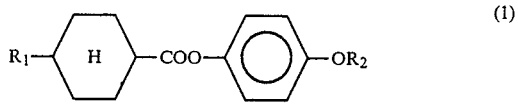

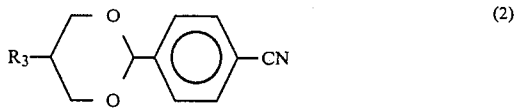

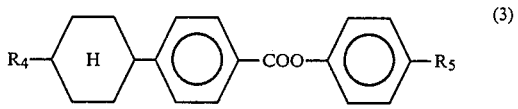

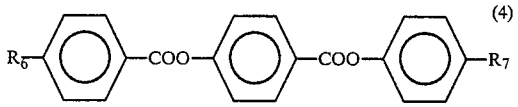

wherein, $R_1$ is a straight-chain alkyl group having 3 to 6 carbon atoms; $R_2$ is a straight-chain alkyl group having 1 to 6 carbon atoms; $R_3$ is a straight-chain alkyl group having 2 to 5 carbon atoms; $R_4$ is a straight-chain alkyl group having 3 to 5 carbon atoms; $R_5$ is a straight-chain alkyl group having 1 to 7 carbon atoms; $R_6$ is a straight-chain alkyl group having 3 to 5 carbon atoms; and $R_7$ is a straight-chain alkyl group having 1 to 5 carbon atoms, and wherein compound (1) is present between about 40 to 70% by weight, compound (2) is present between about 25 to 45% by weight, compound (3) is present between about 3 to 15% by weight, and compound (4) is present between about 3 to 15% by weight of the composition.

2. A liquid composition according to claim 1, wherein $R_5$ is straight-chain alkyl group having 2 to 5 carbon atoms and $R_7$ is a straight-chain alkyl group having 4 or 5 carbon atoms.

3. A liquid composition according to claim 1, wherein compound (1) is present between about 45 to 65% by weight, compound (2) is present between about 25 to 43% by weight, compound (3) is present between about 4 to 11% by weight, and compound (4) is present between about 4 to 8% by weight of the composition.

4. A liquid composition according to claim 1, including about 56.5 percent by weight of compound (1); about 27.5 percent by weight of compound (2); about 8 percent by weight of compound (3); and about 8 percent by weight of compound (4).

5. A liquid composition according to claim 3, including about 45.0 percent by weight of compound (1); about 41.0 percent by weight of compound (2); about 7.0 percent by weight of compound (3); and about 7.0 percent by weight of compound 4.

6. A liquid composition according to claim 3, including about 50.0 percent by weight of compound (1); about 36.0 percent by weight of compound (2); about 7.0 percent by weight of compound (3); and about 7.0 percent by weight of compound 4.

7. A liquid composition according to claim 3, including about 64 percent by weight of compound (1); about 28 percent by weight of compound (2); about 4 percent by weight of compound (3); and about 4 percent by weight of compound (4).

8. A liquid composition according to claim 3, including about 55 percent by weight of compound (1); about 28 percent by weight of compound (2); about 11 percent by weight of compound (3); and about 6 percent by weight of compound (4).

9. A liquid crystal composition according to claim 1 wherein the optical anisotropy of the liquid crystal composition is about 0.1 to 0.12.

10. A liquid crystal display device comprising opposed, spaced-apart transparent substrates, electrodes selectively deposited on the interior surfaces of each substrate, a nematic liquid crystal composition having positive dielectric anistropy disposed between said substrates, and a polarizer on the outer surface of each substrate, said liquid crystal composition comprising at least one of each of compounds represented by the formulas (1), (2), (3), and (4):

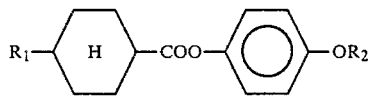
(1)

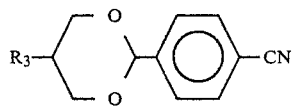
(2)

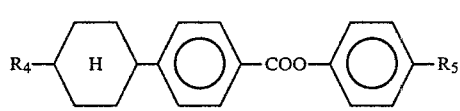
(3)

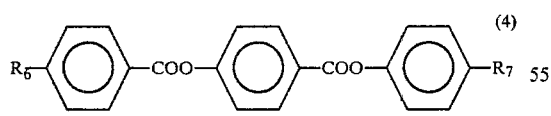
(4)

wherein, $R_1$ is a straight-chain alkyl group having 3 to 6 carbon atoms; $R_2$ is a straight-chain alkyl group having 1 to 6 carbon atoms; $R_3$ is a straight-chain alkyl group having 2 to 5 carbon atoms; $R_4$ is a straight-chain alkyl group having 3 to 5 carbon atoms; $R_5$ is a straight-chain alkyl group having 1 to 7 carbon atoms; $R_6$ is a straight-chain alkyl group having 3 to 5 carbon atoms, and $R_7$ is a straight-chain alkyl group having 1 to 5 carbon atoms, and wherein said liquid crystal composition comprises from about 40 to 70% by weight of compounds of formula (1), from about 25 to 45% by weight of compounds of formula (2), from about 3 to 15% by weight of compounds of formula (3), and from about 3 to 15% by weight of compounds of formula (4).

11. A liquid crystal display device according to claim 10 wherein the optical anistropy of the liquid crystal composition is about 0.1 to 0.12.

12. A liquid crystal display device according to claim 10, wherein the cell thickness is about 4 to 6μ.

13. A liquid crystal display device according to claim 11, wherein the cell thickness is about 4 to 6μ.

14. A liquid crystal display device according to claim 10 further including time-sharing circuit means for generating time-sharing signals and selectively applying said signals to the electrodes.

15. A liquid crystal display device according to claim 14 having a duty ratio of up to about 1/16.

16. A liquid crystal display device according to claim 15 which operates at a voltage of no more than 5 V at room temperature.

17. A liquid crystal composition according to claim 1, further including at least one compound represented by the formulas (5) and (6):

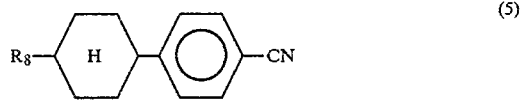
(5)

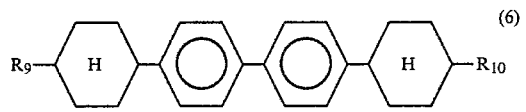
(6)

wherein, $R_8$ is a straight-chain alkyl group having 2 to 8 carbon atoms; $R_9$ and $R_{10}$ each is a straight-chain alkyl group having 2 to 5 carbon atoms, and wherein said at least one compound represented by formulas (5) and (6) is present in an amount between about 1 to 10% by weight of the liquid crystal composition.

18. A liquid crystal composition according to claim 1, further including at least at least one compound represented by the formulas (7), (8), and (9):

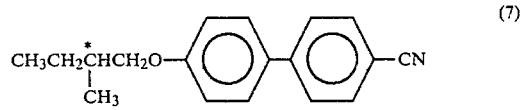
(7)

(8)

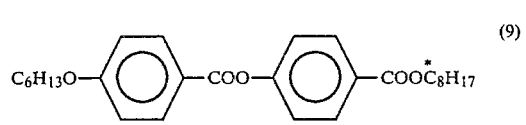
(9)

19. A liquid crystal composition according to claim 18, wherein each of the compounds represented by formulas (7), (8) and (9) is included in an amount between about 0.01 to 3% by weight.

20. A liquid crystal display device according to claim 10, wherein said nematic crystal composition further includes at least one compound represented by the formulas (5) and (6):

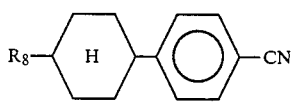 (5)

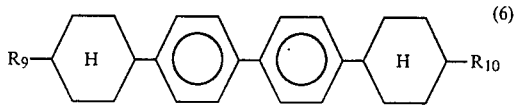 (6)

wherein, $R_8$ is a straight-chain alkyl group having 2 to 8 carbon atoms; $R_9$ and $R_{10}$ each is a straight-chain alkyl group having 2 to 5 carbon atoms, and wherein said at least one compound represented by formulas (5) and (6) is included in an amount between about 1 to 10% by weight of said liquid crystal composition.

21. A liquid crystal display device according to claim 10, wherein said liquid crystal composition further includes at least one compound represented by the formulas (7), (8), and (9):

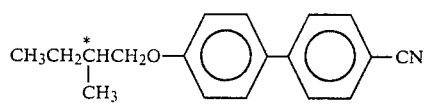 (7)

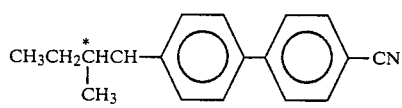 (8)

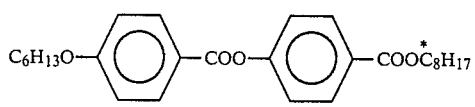 (9)

22. A liquid crystal display device according to claim 21, wherein said at least one compound represented by the formulas (7), (8) and (9) is included in an amount between about 0.01 to 3% by weight in said liquid crystal composition.

23. A liquid crystal composition according to claim 1, further including compounds represented by formulas (7) and (8):

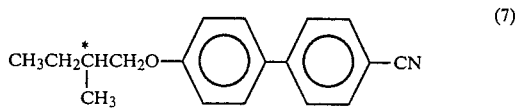 (7)

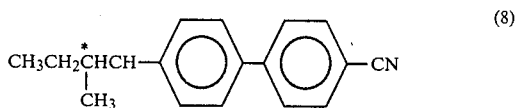 (8)

24. A liquid crystal composition according to claim 23, wherein said compounds represented by formulas (7) and (8) are included in a total amount between about 0.01 to 3% by weight.

25. A liquid crystal display device according to claim 10, wherein said nematic liquid crystal composition further includes compounds represented by formulas (7) and (8):

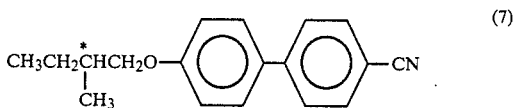 (7)

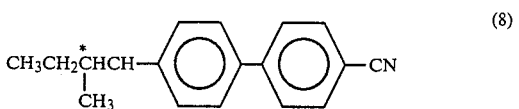 (8)

26. A liquid crystal display device according to claim 25, wherein said compounds represented by formulas (7) and (8) are included in a total amount between about 0.01 to 3% by weight.

* * * * *